July 20, 1926.

D. MACADIE 1,593,024

ELECTRICAL MEASURING INSTRUMENT

Filed May 14, 1923  2 Sheets-Sheet 1

Donald Macadie
INVENTOR
his Attorney.

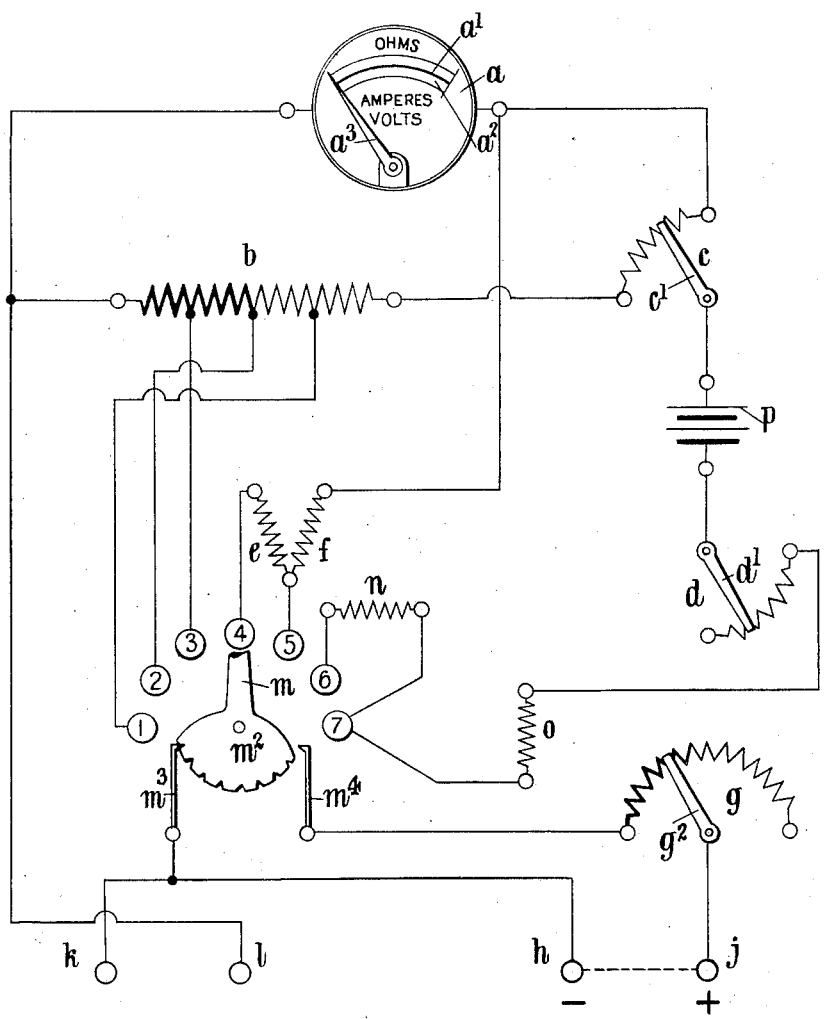

Patented July 20, 1926.

1,593,024

UNITED STATES PATENT OFFICE.

DONALD MACADIE, OF LONDON, ENGLAND, ASSIGNOR TO THE AUTOMATIC COIL WINDER & ELECTRICAL EQUIPMENT COMPANY LIMITED, OF LONDON, ENGLAND, A BRITISH COMPANY.

ELECTRICAL MEASURING INSTRUMENT.

Application filed May 14, 1923, Serial No. 638,734, and in Great Britain May 20, 1922.

This invention consists in improvements in or relating to electrical measuring apparatus and has for its object to provide an apparatus whereby the values of current, voltage and resistance can be read on a single instrument.

According to the present invention, therefore, there is provided a combined electrical portable measuring apparatus whereby the values of current, voltage and resistance can be measured by means of a single moving-coil instrument. Further, according to this invention, there is combined with an instrument which forms part of the apparatus and is suitably connected to serve either as an ammeter or a voltmeter means including a battery whereby resistance can be measured and means for compensating for variations in the voltage and internal resistance of such battery.

In carrying out the invention the meter is provided with a permanent shunt resistance, a relatively high series resistance in circuit with leads from the instrument terminals to be used when measuring voltage, and a source of electrical energy in series with a series resistance and in the terminal circuit of the instrument to be used when measuring values of resistance.

Conveniently the shunt resistance has tappings taken to a switch-device whereby the value of the shunt resistance can be varied so as to vary the value of the scale-reading for reading amperes. Similarly also the series resistance to be used when measuring voltage may be in two or more parts also connected by tappings to a switch for varying the value of the series resistance.

The invention will now be described with reference to the accompanying drawings which illustrate by way of example and not of limitation the preferred embodiment of this invention.

Fig. 3 shows diagrammatically the electrical connections of the apparatus.

The indicating instrument $a$ is of the movable coil type and is enclosed in the customary manner in a cylindrical casing of, for example, brass. The instrument is mounted at the upper end of the cover of a box for containing the instrument and its associated parts. Extending alongside the cylindrical casing of the instrument proper is a flat strip of insulating material such as vulcanite, on which is wound the shunt resistance $b$, preferably with wire having the same resistance temperature coefficient as the wire on the moving coil of the meter $a$ and of sufficient diameter to carry the required currents, and constituting part of it is a short length of fine insulated wire resistance wound on a curved strip of metal covered by an insulating material with the covering of the wire removed at one edge of the strip to be engaged by a switch contact-spring for a purpose to be more clearly defined hereinafter. This portion of the shunt resistance will, in the following description, be referred to as resistance $c$. There is another similar fine wire resistance formed in the same manner which will be referred to hereinafter as resistance $d$ and these resistances are mounted respectively at the two top corners of the cover with the spindles of the contact-springs projecting through to the front of the cover, so as to allow for adjustment from the outside.

Figure 2:
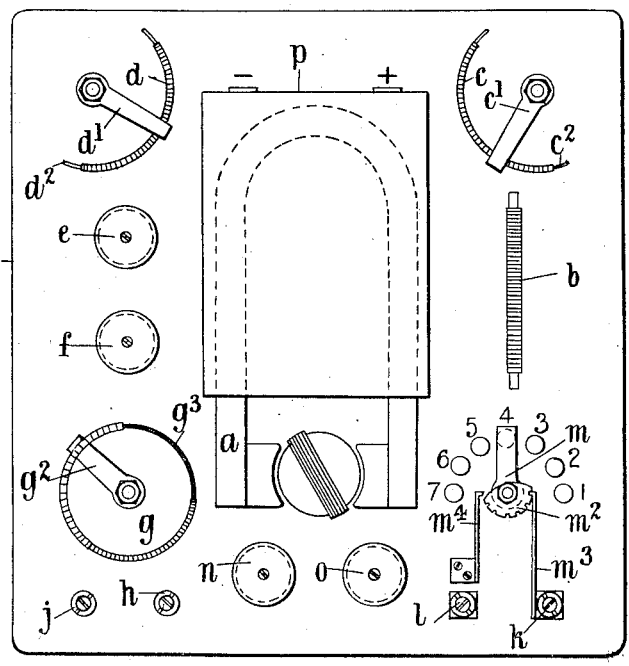
Fig. 2 is an internal rear elevation of the apparatus with the rear cover removed.

Two series resistances, for use when the apparatus is to be employed as a voltmeter, are in the form of coils wound on bobbins and are connected in series with one another and will be referred to hereinafter as resistances $e$ and $f$, (Figs. 2 and 3) the resistance $e$ being the larger of the two.

Figure 1:
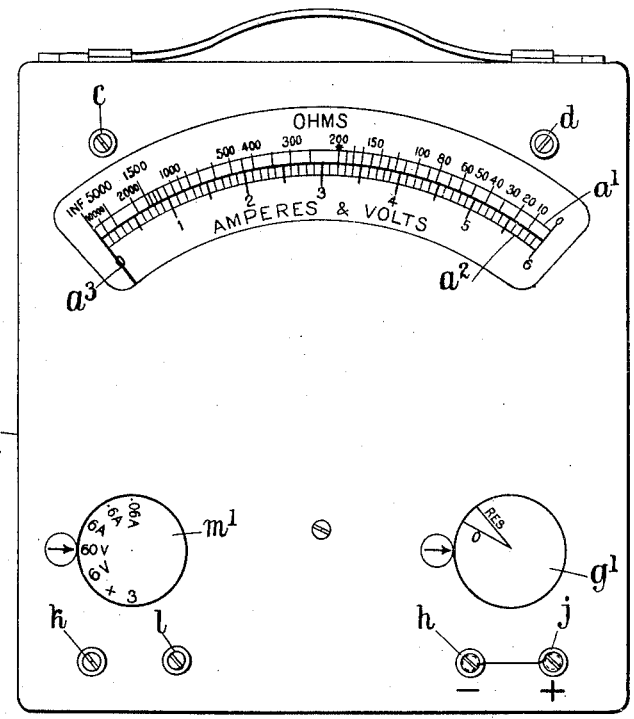
Fig. 1 is a front elevation of the apparatus.

A rheostat supported on the back of the cover at one of the bottom corners thereof, and referred to hereinafter as the resistance $g$ (Figs. 1, 2 and 3) is formed similarly to resistances $c$ and $d$, but on a larger scale, and the first portion is wound with wire of a diameter large enough to carry the heaviest current for which the apparatus is designed. Its contact-spring spindle projects through to the front of the cover and is provided with an operating handle. Beneath the operating handle $g^1$ of the rheostat are two terminals $h$ and $j$ which are normally strapped together on the outside.

At the other bottom corner of the cover are the two terminals $k$ and $l$ for the testing leads. Above these terminals is the main operating switch for the apparatus comprising a pivoted contact-spring $m$ (Figs. 2 and 3) sliding over studs all on the back of the cover with the operating handle $m^1$ (Fig. 1) of the contact-spring $m$ (Figs. 2 and 3) exposed at the front of the cover, and suitably marked. To the spindle of this main contact spring is fixed a notched segment $m^2$ (Figs. 2 and 3) engaging either with one or the other of two spring tongues $m^3$ and $m^4$ so that when one or the other of the tongues rests in a notch on the segment the contact-spring is on one of the studs. There are seven studs, which will be referred to hereinafter by the reference numerals 1—7.

The connections are so follows:—

Terminal $l$ is connected to one terminal of the indicating instrument $a$, the other terminal of which is connected to the free end of resistance $f$.

Resistances $c$ and $b$ are joined in series and are connected to the terminals of the indicating instrument $a$ thereby forming a permanent shunt to the moving coil.

Tappings are taken from three points in the shunt resistance $b$ to studs 1, 2 and 3 respectively.

The free end of resistance $e$ is connected to stud 4, the junction between resistances $e$ and $f$ is connected to stud 5. Across studs 6 and 7 is a resistance $n$ and connected also to stud 7 is one end of another resistance $o$ connected at its other end to one end of resistance $d$.

Terminal $k$ of the apparatus is connected to terminal $h$ and to the spring tongue $m^3$ of the main switch said tongue engaging the segment $m^2$ when the switch contact-spring $m^1$ is on studs 4, 5, 6 or 7. The spring tongue $m^4$ which engages the switch-segment when the switch contact-spring $m$ is on studs 1, 2 or 3, is connected to the adjustable rheostat $g$ of which the contact-spring $g^2$ is in connection with terminal $j$.

A three-volt dry battery $p$ (Figs. 2 and 3) is connected in series between the switch contact-springs $c^1$ and $d^1$ of the adjustable resistances $c$ and $d$ respectively and is carried in clips (not shown) at the back of the casing of the apparatus.

The resistance of the moving coil of the meter $a$ approximates that of the shunt $b$ and the other resistances are suitably fixed to give the desired reading on the scales, which depend on the degree of sensitiveness of the meter.

The scale for reading amperes and volts is marked 0–6 and is divided into 10 divisions between each numeral.

When the apparatus is desired to be used as an ammeter, the current to be measured or adjusted is connected to the two terminals $k$ and $l$ and the main switch contact spring $m$ is set to studs 1, 2 or 3. The positions of the tappings from the shunt resistance are so chosen that resistances between them permit current values to be read in the following orders:—

When the main switch contact-spring $m$ is on stud 1 the scale will read in hundredths of amperes, on stud 2 in tenths of amperes, and on stud 3 in amperes. In either of these positions the current to be measured is divided at the corresponding shunt tapping, the main portion flows through one part of the shunt with a relatively small proportion passing through the other part of the shunt, resistance $c$ and the moving coil of the meter.

If it is desired to regulate the current supplied to a circuit, the rheostat $g$, which is normally in circuit, can be adjusted to the required extent. It also serves as a safety device in switching in for current tests.

In cases where an instrument or apparatus under test is not connected with a source of current-supply, terminals $h$ and $j$ are unstrapped and are then connected up to an outside source of current-supply thus leaving terminals $k$ and $l$ free to be connected up with such instrument or apparatus.

If the main switch contact-spring is moved to stud 4 the circuit from the main terminals is through resistances $e$ and $f$ to the moving coil, which is permanently shunted by resistances $c$ and $b$, thence to main terminal $l$. The same scale can be then employed to read in volts to be multiplied by 10 whereas by moving the main switch contact-spring to stud 5 (cutting out the large resistance $e$) the same scale can read in volts.

The scale $a^1$ for reading resistance is marked above the amperes and volts scale $a^2$ and ascends in the reverse direction.

The resistance to be measured is connected across terminals $k$ and $l$ of the instrument and the main switch contact-spring is moved on to stud 7 in which position current from the battery will divide at a regulated point in resistance $c$, a portion flowing on one side of resistance $c$ and through the meter and the remainder through the other side of resistance $c$ and through the shunt $b$ thence joining together and passing through the resistance being measured connected to $k$ and $l$, through resistance $o$ and regulated amount of resistance $d$ back to negative pole of battery. The scale is calibrated to give direct readings in ohms.

The variable resistance $d$ is provided to compensate for any alteration in the internal resistance of the battery or of the testing leads and the resistance $c$ serves as a potentiometer to compensate for changes in the voltage of the battery by ensuring that the same P. D. is always used across the meter terminals for a particular test. Thus, by moving the switch-arm to stud 7 and short-circuiting terminals $k$ and $l$ resistance $d$ can be adjusted until the pointer $a^3$ of the instrument $a$ gives a zero resistance reading on the scale (i. e. a maximum current reading). The switch contact-spring can then be moved on to stud 6 when the pointer $a^3$ should move to indicate the 200 ohms mark which is the value of resistance $n$. If it does not do so the position of the switch contact-spring on resistance $c$ can be adjusted until the pointer has moved to an equivalent amount on the other side of the 200 ohms mark whereafter the switch contact-spring for resistance $d$ can serve to adjust the pointer to the 200 ohms reading. The main switch contact-spring is then moved back to stud 7 whereafter by inserting a resistance between terminals $k$ and $l$ of the instrument the reading on the scale will give the actual value of the resistance inserted.

The resistances and the rheostat are conveniently constructed by winding the wire on flat metal strips $c^2$, $d^2$ and $g^3$ respectively and then bending the strips into the desired shapes as shown, the metal strip consisting of copper or other metal which will readily dissipate heat.

The whole apparatus can be made up into a compact and portable form and enclosed in a small box or case $q$ of dimensions similar to testing instruments generally employed.

I claim:

1. A combined electrical portable measuring apparatus comprising a single moving-coil instrument, means whereby the values of current, voltage and resistance can be measured, a battery connected in the circuit for resistance measurements, and electrical means whereby any alteration in the voltage or in the internal resistance of said battery can be compensated thereby enabling correct readings to be taken.

2. A combined electrical portable measuring apparatus comprising a single moving-coil instrument, means whereby the values of current, voltage and resistance can be measured, and means whereby the change-over from one circuit to another for the different values of current, voltage and resistance may be effected without alteration of the testing leads.

3. A combined electrical portable measuring apparatus comprising a meter, a shunt comprising a fixed resistance and an adjustable resistance across said meter, a battery for resistance measurements in series with said adjustable resistance and a further adjustable resistance, said adjustable resistances being used for compensating for changes in voltage and internal resistance of the battery respectively, a plurality of contact-studs, connections between some of said contact-studs and different points on said fixed resistance, for use in current measurements, resistances in series between other of said contact-studs and one terminal of the meter for use in measuring voltage, a resistance for checking the meter across the remaining contact studs of which one is connected to a further resistance which in turn is connected with the second above mentioned adjustable resistance, a contact spring connected to one of the input terminals and one of the terminals for the connection of an external source of current, a further contact-spring connected to the other of the said terminals for the connection of an external source of current through an adjustable rheostat, and a switch adapted to connect one or other of said contact-springs to the appropriate contact stud.

In testimony whereof I have signed my name to this specification.

DONALD MACADIE.